(12) United States Patent
Prasky et al.

(10) Patent No.: US 12,014,182 B2
(45) Date of Patent: Jun. 18, 2024

(54) VARIABLE FORMATTING OF BRANCH TARGET BUFFER

(71) Applicant: International Business Machines Corporation, Armonk, NY (US)

(72) Inventors: Brian Robert Prasky, Campbell Hall, NY (US); James Bonanno, Liberty Hill, TX (US); Adam Benjamin Collura, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 38 days.

(21) Appl. No.: 17/407,267

(22) Filed: Aug. 20, 2021

(65) Prior Publication Data
US 2023/0060033 A1   Feb. 23, 2023

(51) Int. Cl.
*G06F 9/38* (2018.01)
*G06F 9/30* (2018.01)

(52) U.S. Cl.
CPC ........ *G06F 9/3844* (2013.01); *G06F 9/30058* (2013.01); *G06F 9/3806* (2013.01)

(58) Field of Classification Search
CPC .. G06F 9/3806; G06F 9/3844; G06F 9/30058; G06F 9/323
See application file for complete search history.

(56) References Cited

U.S. PATENT DOCUMENTS

| | | | |
|---|---|---|---|
| 5,276,832 A | 1/1994 | Holman, Jr. | |
| 6,370,618 B1 | 4/2002 | Arimilli et al. | |
| 7,124,287 B2 | 10/2006 | Prasky et al. | |
| 7,779,232 B2 | 8/2010 | Doing et al. | |
| 10,481,912 B2 | 11/2019 | Bonanno et al. | |
| 10,592,248 B2 | 3/2020 | Havlir | |
| 10,754,773 B2 | 8/2020 | Anghel et al. | |
| 11,163,573 B2 * | 11/2021 | Bonanno | G06F 9/30145 |
| 2004/0103251 A1 | 5/2004 | Alsup | |
| 2013/0111136 A1 | 5/2013 | Bell, Jr. | |
| 2013/0339694 A1 * | 12/2013 | Bonanno | G06F 9/30145 |
| | | | 712/238 |
| 2020/0012497 A1 * | 1/2020 | Clouqueur | G06F 9/3806 |
| 2020/0341770 A1 | 10/2020 | Clouqueur et al. | |

OTHER PUBLICATIONS

Sparsh Mittal; A Survery of Techniques for Dynamic Branch Prediction; 2018; 37 pages.

* cited by examiner

*Primary Examiner* — Andrew Caldwell
*Assistant Examiner* — Kasim Alli
(74) *Attorney, Agent, or Firm* — CANTOR COLBURN LLP; Jeffrey Ingalls

(57) ABSTRACT

Embodiments include a hierarchical metadata prediction system that includes a first line-based predictor having a first line for storage of metadata entries, and a second line-based predictor configured to store metadata entries from the first line-based predictor. The second line-based predictor has a second line, the second line including a plurality of containers, the plurality of containers including at least a first set of containers having a first size and a second set of containers having a second size. The system also includes a processing device configured to transfer one or more metadata entries between the first line-based predictor and the second-line based predictor. Embodiments also include a computer-implemented method and a computer program product.

20 Claims, 14 Drawing Sheets

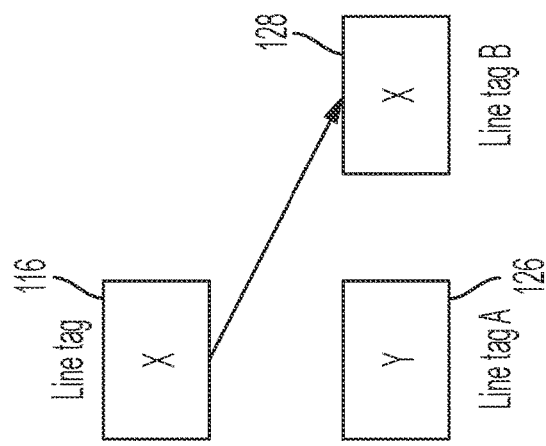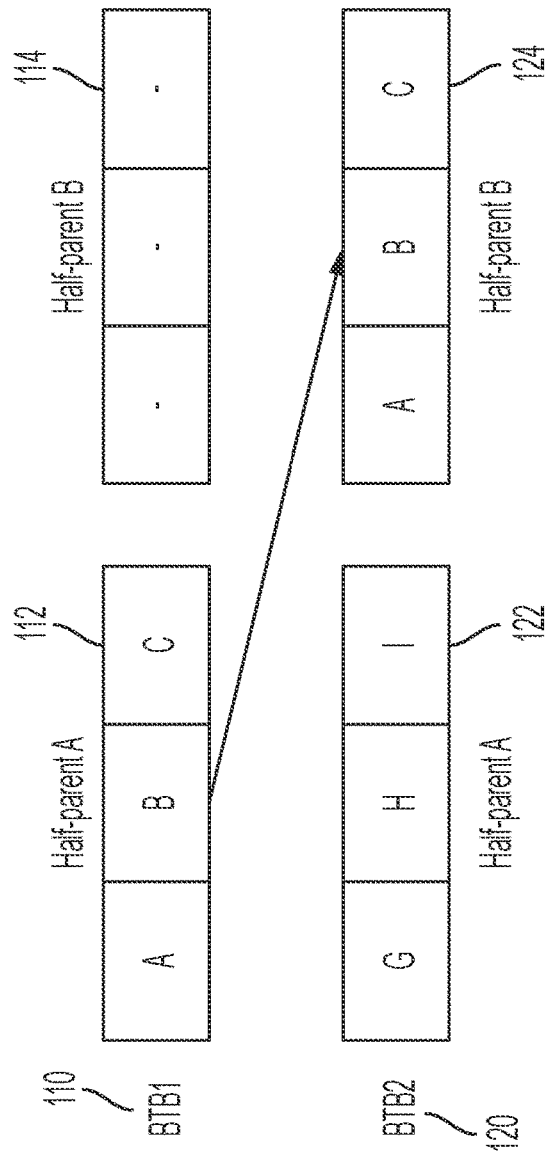
FIG. 13
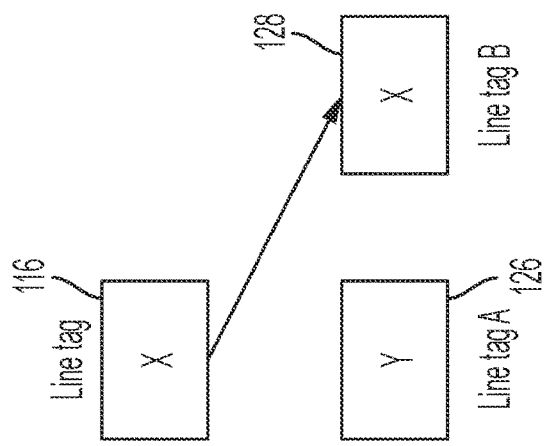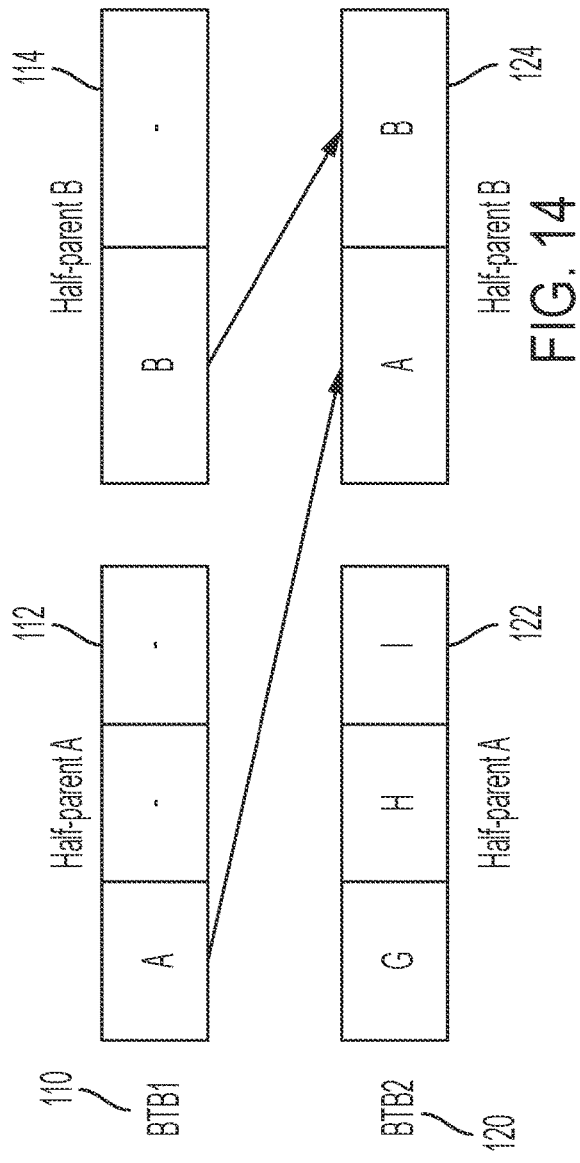
FIG. 14

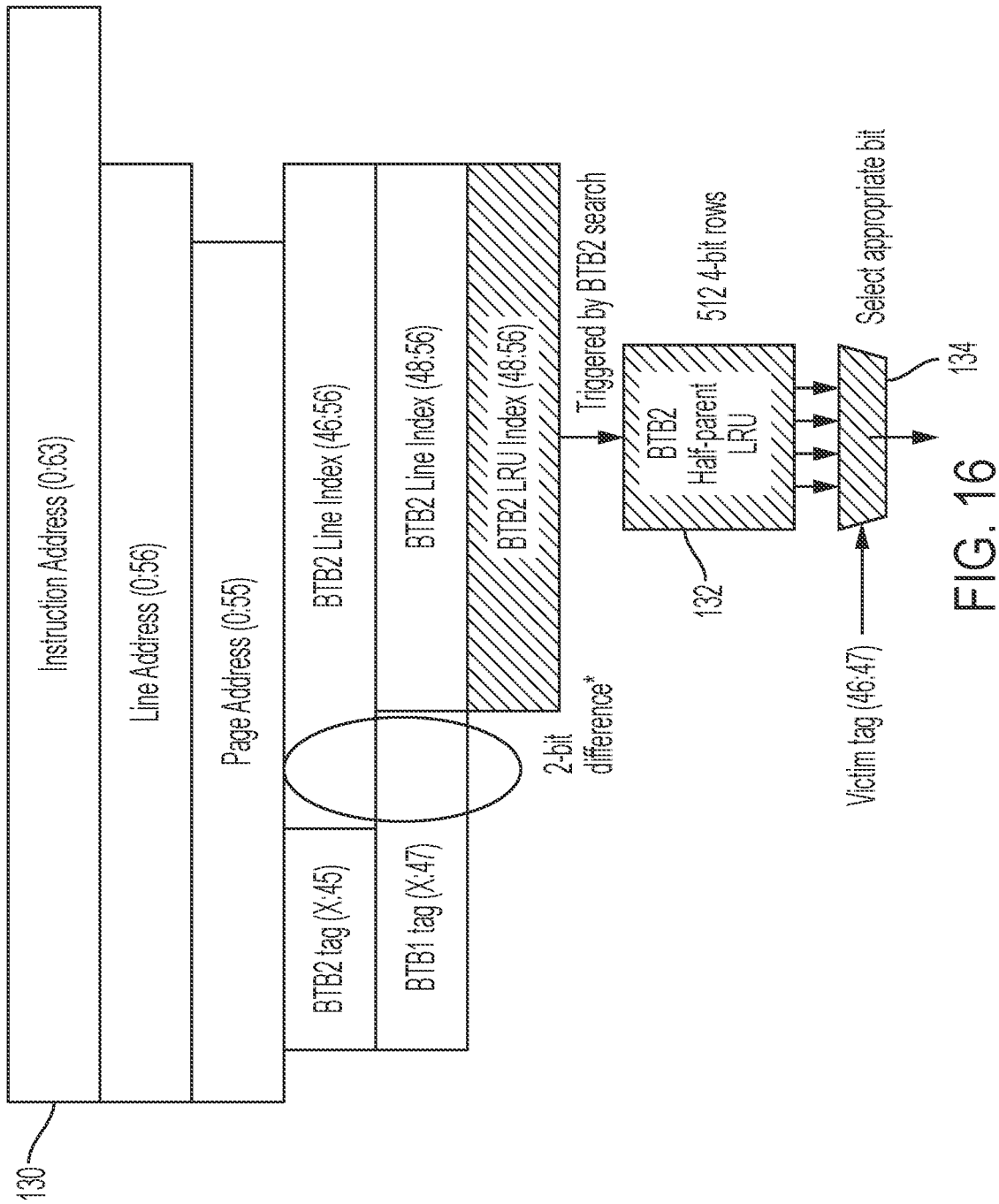

VARIABLE FORMATTING OF BRANCH TARGET BUFFER

BACKGROUND

The present disclosure relates to computer processing systems, and more specifically, to methods, systems and computer program products for line-based prediction.

An instruction pipeline in a computer processor improves instruction execution throughput by processing instructions using a number of pipeline stages, where multiple stages can act on different instructions of an instruction stream in parallel. A conditional branch instruction in an instruction stream may result in a pipeline stall if the processor waits until the conditional branch instruction is resolved in an execution stage in the pipeline before fetching a next instruction in an instruction fetching stage for the pipeline. A branch predictor may attempt to guess whether a conditional branch will be taken or not. A branch predictor may also include branch target prediction, which attempts to guess a target of a taken conditional or unconditional branch before it is computed by decoding and executing the instruction itself. A branch target may be a computed address based on an offset from the branch address or an indirect reference through a register.

A branch target buffer (BTB) can be used to predict the target of a predicted taken branch instruction based on the address of the branch instruction. Predicting the target of the branch instruction can prevent pipeline stalls by not waiting for the branch instruction to reach the execution stage of the pipeline to compute the branch target address. By performing branch target prediction, the branch's target instruction decode may be performed in the same cycle or the cycle after the branch instruction instead of having multiple bubble/empty cycles between the branch instruction and the target of the predicted taken branch instruction.

SUMMARY

Embodiments of the present invention are directed to a hierarchical metadata prediction system that includes a first line-based predictor having a first line for storage of metadata entries, and a second line-based predictor configured to store metadata entries from the first line-based predictor. The second line-based predictor has a second line, the second line including a plurality of containers, the plurality of containers including at least a first set of containers having a first size and a second set of containers having a second size. The system also includes a processing device configured to transfer one or more metadata entries between the first line-based predictor and the second-line based predictor.

Embodiments of the present invention are directed to a computer-implemented method that includes receiving an instruction from a processing pipeline at a hierarchical metadata prediction system, the metadata prediction system including a first line-based predictor having a first line for storage of metadata entries, and a second line-based predictor configured to store metadata entries from the first line-based predictor. The second line-based predictor has a second line, the second line including a plurality of containers, the plurality of containers including at least a first set of containers having a first size and a second set of containers having a second size. The method also includes transferring a metadata entry from the first line-based predictor to the second line-based predictor, wherein the transferring includes storing the transferred metadata entry into one or more containers based on a size of the metadata entry.

Embodiments of the present invention are directed to a computer program product that includes a tangible storage medium readable by a processing circuit and storing instructions for execution by the processing circuit for performing a method. The method includes receiving an instruction from a processing pipeline at a hierarchical metadata prediction system, the metadata prediction system including a first line-based predictor having a first line for storage of metadata entries, and a second line-based predictor configured to store metadata entries from the first line-based predictor. The second line-based predictor has a second line, the second line including a plurality of containers, the plurality of containers including at least a first set of containers having a first size and a second set of containers having a second size. The method also includes transferring a metadata entry from the first line-based predictor to the second line-based predictor, wherein the transferring includes storing the transferred metadata entry into one or more containers based on a size of the metadata entry.

Other embodiments of the present invention implement features of the above-described apparatus as a method of configuring the apparatus.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 13 depicts an example of BTB1 parent having half parents, and a BTB2 parent, and depicts aspects of an embodiment of a branch prediction method that includes dynamically changing an associativity of the BTB2 parent;

FIG. 14 depicts an example of a BTB1 parent having half parents, and a BTB2 parent, and depicts aspects of an embodiment of a branch prediction method that includes dynamically changing an associativity of the BTB2 parent;

FIG. 16 depicts an embodiment of a structure used to perform a selection process as part of writing a branch entry to a BTB2.

DETAILED DESCRIPTION

Figure 1:
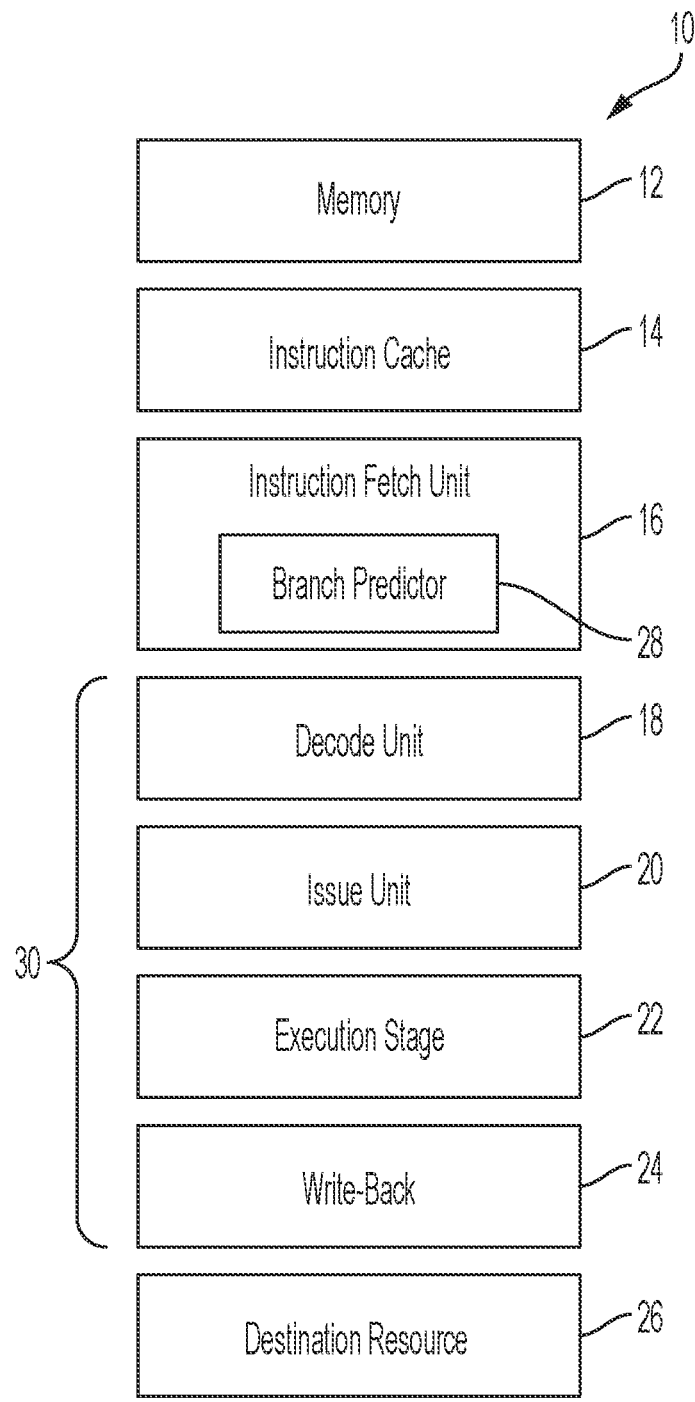
FIG. 1 depicts an embodiment of a processing system for practice of the teachings herein.

In accordance with exemplary embodiments of the invention, methods, systems and computer program products for metadata prediction are provided. The methods and systems described herein are directed to a hierarchical metadata prediction system that includes a first line-based predictor, such as a level one branch target buffer (BTB), and a second line-based predictor, such as a level two BTB.

In an embodiment, a branch predictor is configured to perform branch prediction methods using a level one BTB (also referred to as a "BTB1") having slots for storing branch entries (also referred to as "branches"). The slots may have at least two different entry formats or sizes (e.g., a medium entry format and a large entry format). Methods in this embodiment include dynamically changing a format of an incoming branch (also referred to as a "branch format") to match the entry format of a slot. The methods in this embodiment may also include changing the format of an existing branch and/or changing the format of a slot. The format changes are performed, for example, to increase or maximize the storage capacity of a BTB1.

In an embodiment, the hierarchical metadata prediction system includes a level two BTB (also referred to as a "BTB2") having multiple array instances (referred to herein as "containers"), which may be physically separate. The containers may be configured to have a plurality of different sizes. For example, the BTB2 includes a first set (i.e., at least one) of containers having a first size and a second set of containers having a second size. Methods of branch prediction according to this embodiment include writing branches from a BTB1 to BTB2 containers according to a selection process to improve or maximize branch density in the BTB2.

The hierarchical metadata prediction system may be a parent-based system in which lines of the BTB1 and/or the BTB2 are divided into parent arrays. For example, the BTB1 is divided into a plurality of parents, where each parent can store a plurality of branches, and each parent is further divided into a plurality of sub-parent arrays, which may be half parent arrays, quarter parent arrays or sub-parent arrays of any suitable size. Although descriptions herein are in the context of half parents, it is noted that the descriptions may be applicable to sub-parent arrays of various sizes. Each half parent includes slots for storing branch entries. In an embodiment, the BTB2 is configured to have sub-parent granularity and dynamic associativity, allowing parts of parent entries to be separately written so as to increase density in the BTB2 and reduce underutilization of the BTB2.

Embodiments described herein provide for a number of advantages and technical effects. Such advantages include higher utilization of BTBs, resulting in greater branch density and greater capacity than other BTB systems. In addition, the embodiments can increase capacity without negatively affecting latency.

Although embodiments are described herein the context of branch prediction using BTB structures, the embodiments are not so limited, as one or more of the embodiments may be used in conjunction with various types of metadata and line-based predictors. In the following, the description of functions of various components and structures of the systems described herein may be considered to be part of one or more branch prediction methods.

FIG. 1 is a block diagram of an embodiment of a processing system 10. The processing system 10 includes a memory 12, an instruction cache 14, an instruction fetch unit 16, a branch predictor 28, and a processing pipeline 30. The processing pipeline 30 includes a decode unit 18, an issue unit 20, an execution stage 22, and/or a write-back logic 24. The processing system 10 may be included within a computer processor or otherwise distributed within a computer system. The instruction cache 14 accesses instructions in the memory 12, and stores instructions to be fetched.

The branch predictor 28 may be included in the instruction fetch unit 16 or located separately from the instruction fetch unit 16. The instruction fetch unit 16 can also include other branch prediction logic (not depicted).

In an embodiment, the memory 12 and/or the instruction cache 14 includes multiple cache levels. A data cache (not depicted) may also be included in the processing system 10.

Although one pipeline is showed in FIG. 1, the processing system 10 may include any number of pipelines 30 and instruction fetch units 16. The processing pipeline 30 may include the decode unit 18, the issue unit 20, the execution stage 22, and write-back logic 24. The entire instruction fetch unit 16 and/or the branch predictor 28 may also be part of the processing pipeline 30. The processing pipeline 30 may include other features, such as error checking and handling logic, one or more parallel paths through the processing pipeline 30, and other features known in the art. While a forward path through the processing system 10 is depicted in FIG. 1, other feedback and signaling paths may be included between elements of the processing system 10.

The instruction fetch unit 16 is configured to fetch instructions from the instruction cache 14 for processing by the decode unit 18, which decodes instructions and passes the decoded instructions, portions of instructions, or other decoded data to the issue unit 20. The issue unit 20 analyzes the instructions or other data and transmits the decoded instructions, portions of instructions, or other data to one or more execution units in the execution stage 22 for execution of instructions based on the analysis. The execution stage 22 may include a plurality of execution units, such as fixed-point execution units, floating-point execution units, load/ store execution units, and vector execution units. The write-back logic 24 writes results of instruction execution back to a destination resource 26. The destination resource 26 may be any type of resource, including registers, cache memory, other memory, I/O circuitry to communicate with other devices, other processing circuits, or any other type of destination for executed instructions or data.

In some embodiments, the branch predictor 28 includes a branch target buffer (BTB) structure that include one or more BTBs, as well as various structures and buffers to support branch prediction and branch target prediction. In one design implementation known as asynchronous branch prediction, the BTB may be searched in parallel to and independently from instruction fetching to find upcoming branches. In synchronous branch prediction, the BTB may be accessed simultaneously with or after fetching instructions and determining instruction boundaries in order to provide a prediction for each encountered branch instruction. In either design implementation, performance benefits of the BTB are a function of the accuracy of the prediction provided from the BTB, a function of the capacity of the BTB, and the latency required to access the BTB.

BTBs having various sizes may be included. For example, a larger BTB may provide better prediction accuracy than a smaller BTB because it may store information about more branch instructions; however, a larger BTB typically has a longer latency than a smaller BTB. Thus, in an embodiment, the branch predictor 28 includes (or is connected to) a hierarchical BTB system including both larger and smaller BTBs that facilitate efficient storage of branches in BTBs and balancing of storage space and throughput.

In an embodiment, the hierarchical BTB system includes a first level having one or more relatively fast and small BTBs (BTB1s), and a second level having one or more relatively slow but relatively large second-level BTBs (BTB2s). The BTB system may also include a branch target buffer preload table (BTBP) (or a preload table for another form of metadata), which may be a small BTB that is searched in parallel with a larger main BTB (BTB1) to predict branch instructions' targets, and optionally direction.

The hierarchical BTB structure is configured to store branches in BTB1s and BTB2s (and beyond) in as little space as possible for each branch. Through compacting as many branches as possible in an associated tag for a region of address space, greater efficiency may be achieved. For the BTB1, advantages may include faster search rate, lower start-up latency, faster taken branch to taken branch throughput rate, and/or faster install rate from the BTB2. For the BTB2, advantages may include an increased capacity per unit of area and a more efficient transfer rate, measured in latency and bandwidth, back to the BTB1.

An example of aspects of a branch prediction method includes utilizing various BTBs and other data structures. For example, the branch predictor 28 includes branch prediction and eviction logic, hit detection logic, one or more BTB1s, and one or more BTB2s associated with each BTB1, and may also include structures such as a line index buffer (LIB), a line output buffer (LOB) and/or BTBP.

The branch prediction and eviction logic can control access and updates of branch entries in the BTB1 and BTB2, as well as movement of BTB entries between the BTB1, BTB2, and others (e.g., LOB). When an instruction is accessed (e.g. from a program counter as part of a pipeline stage), the BTB1 is searched for a matching entry, and outputs a branch prediction if a match is found. If the BTB1 search result is a miss, a search of the BTB2 is triggered for BTB entries within a same memory region. If no matching entry is found, branch entries may be generated and stored in the BTB1 and/or the BTB2. A branch entry may also be updated based on, for example, whether the branch was actually taken.

The BTB1 provides a branch prediction if it contains an entry with a branch address matching a search address. If a match is found, the hit detection logic outputs a predicted target address. If the match was from a pre-load table (BTBP), a corresponding matching entry may be loaded from the BTBP to the BTB1 (or loaded to the LOB and to the BTB1 in parallel), which may result in overwriting an existing entry (victim entry). When entries are evicted from the BTB1 to accommodate storing of new BTBP hits, the BTB1 victims are transferred to the BTB2.

Figure 2:
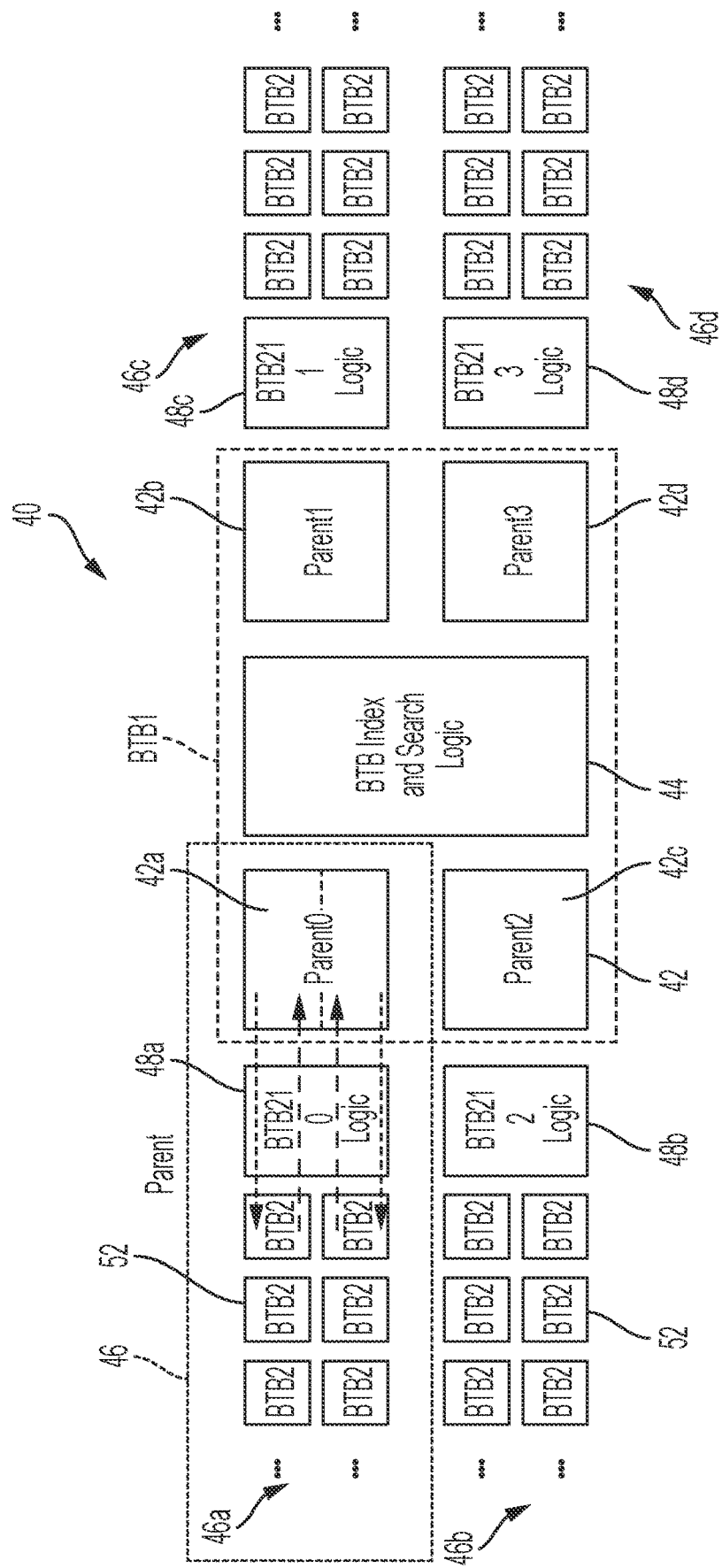
FIG. 2 is a block diagram illustrating aspects of a branch prediction unit of a processing system, in accordance with an exemplary embodiment.

FIG. 2 depicts an example of a hierarchical BTB system 40 that includes BTBs of different sizes. The BTB system 40 may be part of the instruction fetch unit 16 and/or the branch predictor 28. The system 40 includes a BTB1 that is split into a plurality of parent arrays 42 (or simply parents). Each parent array, or parent 42, may support one or more branch entries (or simply branches), where each branch entry represents a branch instruction. A branch entry may include an instruction address (IA), a target address (TA), a valid bit and a prediction (taken or not taken), and may include or be associated with a tag that identifies the entry within a given parent. A branch entry is associated with an index (e.g., part of the instruction address), and is stored in a BTB1 parent assigned that index.

In this example, the BTB1 includes four parents 42a, 42b, 42c and 42d, but is not so limited. The BTB1 also includes index, search and hit logic 44.

The BTB system 40 also includes second level BTBs or BTB2s. The BTB1s and BTB2s are set associative, including multiple sets of BTB entries.

Each parent 42 may be connected to a respective BTB2 structure 46, which includes one or more BTB2s and associated logic 48. In addition, as shown in FIG. 2, each BTB2 may be separated into a plurality of array instances or containers 52. The containers 52 may be of equal size, or they may be of variable size as discussed further herein.

In this example, Parents 42a-42d are connected to BTB2 structures 46a-46d (and logic 48a-48d) respectively. During branch prediction, the branch predictor 28 acquires an instruction address and searches a BTB1 parent having an index that matches the instruction address. If a line entry for that instruction address is not found, the branch predictor searches the corresponding BTB2 structure. If the instruction has not been previously tracked, an entry for that instruction is indexed and stored in a BTB1 parent (or the associated BTB2 structure).

Figure 3:
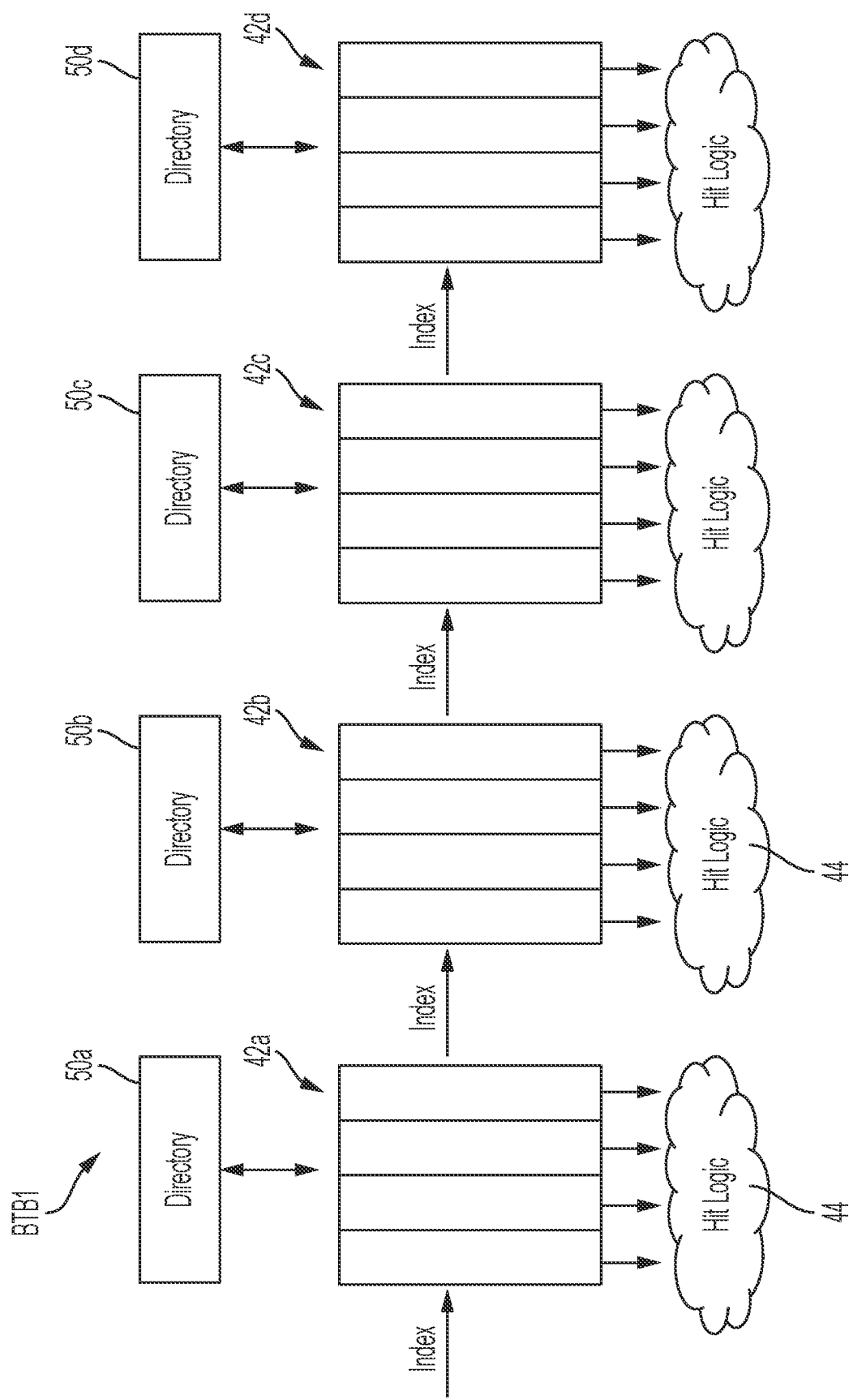
FIG. 3 depicts an embodiment of a level one branch target buffer (BTB) including a BTB line divided into parent arrays.

FIG. 3 is a block diagram representing the four parent arrays or parents 42a-42d of the BTB1. Each parent array in the BTB1 may be associated with a respective directory (e.g., 50a, 50b, 50c, 50d), in which common tag bits (common portions of instruction addresses) are stored. While each parent may be 4-way associative, there may be one directory set per parent array (e.g., the same number of congruence classes in the directory as there is in the parent).

Each parent 42 may be indexed using part of an instruction address within the processor, and tag bits identifying the specific instruction may be stored in the BTB1 with branches of a given entry. For example, for a 47:56 index, tag bits z:46 may be common per parent and stored in the directory and 57:63 may be unique per branch and stored with each branch.

The tag bits may match the remaining address bits of concern that were not used for the indexing. In order to improve the efficiency of a BTB, the BTB may be created such that it has an associativity greater than one (e.g., the parent arrays 46a-46d of FIG. 3 are each showing 4-ways of associativity). By creating an associativity greater than one, multiple branch/target pairs may be stored for a given index into a parent array. To determine which is the correct entry, if an entry at all, the tag bits are used to select one taken branch, at most, entries from the multiple entries stored for a given index.

Each parent array may have a single tag (e.g., obtained by methods as described herein, such as utilizing the common directory tag bits versus the offset tag bits, where the offset tag bits are unique per branch), which may result in fewer bits to track four branches in a single line. A parent may have an increased line size (e.g., 128 bytes), which may likely have at least four branches, but also be likely to overflow. In response to detecting an overflow of the line in a parent, the line may be split and stored in multiple parents. For example, a parent can be split into two parent arrays, in which one parent stores meta data associated with the even half and the other parent stores meta data associated with the odd half of a line. Each parent may be stored as a separate half parent array. Parents may or may not represent the same line size. For example, when going from a 128 byte size to a 64 byte size, the second parent array may be half the line size of the original parent array but the first half parent array is also reduced in line size.

Figure 4:
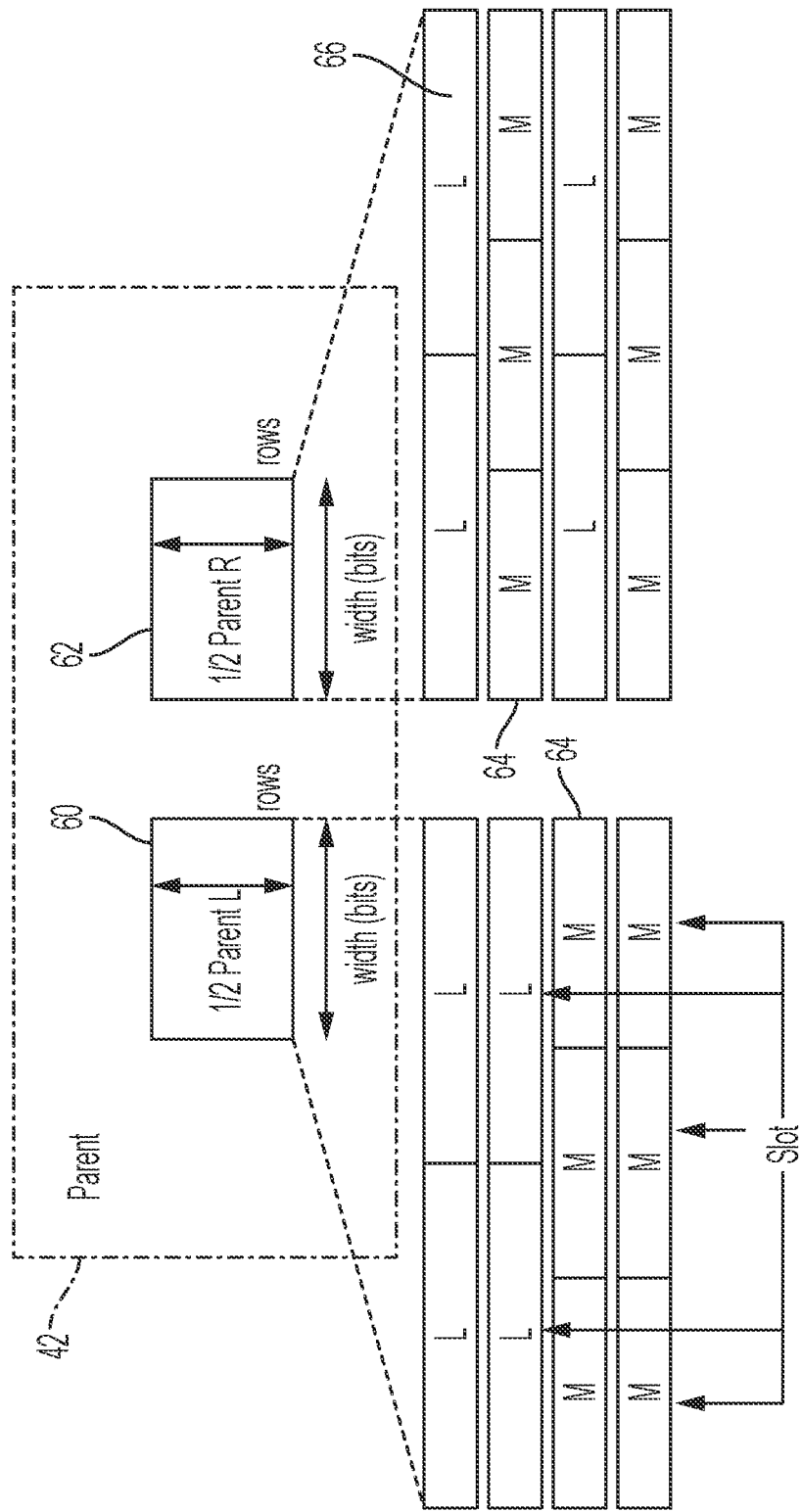
FIG. 4 is a block diagram illustrating an example of a BTB parent array including half parents, each half parent divided into variable format slots.

FIG. 4 depicts an example of a parent 42 including rows that have been split into two half parents, shown as a left (L) half parent 60 and a right (R) half parent 62. Each half parent includes a plurality of rows (e.g., 512), where each row has a width (e.g., 128 bits). There are multiple "slots" in a given row, in which each slot is a section of the half parent that can store a branch entry of a given size. For example, each half parent 60 and 62 includes slots 64 (medium slots) configured to store medium (M) format branch entries, and slots 66 (large slots) configured to store large (L) format branch entries. As shown, in this example, a half parent can store two large branches or three medium branches in a given line.

A medium format branch entry may be referred to herein as a "medium branch," and a large format branch entry may be referred to herein as a "large branch." An example of a medium branch is a 16-bit branch and an example of a large branch is a 32-bit branch. 16-bit branch could be a 16-bit target, meaning that the branch instruction and target address only differ in the least significant 16 bits and the upper 48 bits are the same for the branch and the target. A 32-bit branch could be for a 32-bit target where the least significant 32 bits of the target are predicted and the upper 32 bits of the target are taken to be the same as that of the branch IA.

It is noted that the terms medium and large are relative terms and are not intended to require any specific size or format.

The medium format in this example includes fewer bits of data to represent a branch than the large format. In a medium branch, part of the target instruction address (IA) is stored in the branch's tag bits which are stored in a tag array. A large branch requires a larger portion of, or all of, the target address, which increases the size. It is noted that this can be applicable to branches and/or other forms of metadata.

Figure 5A:
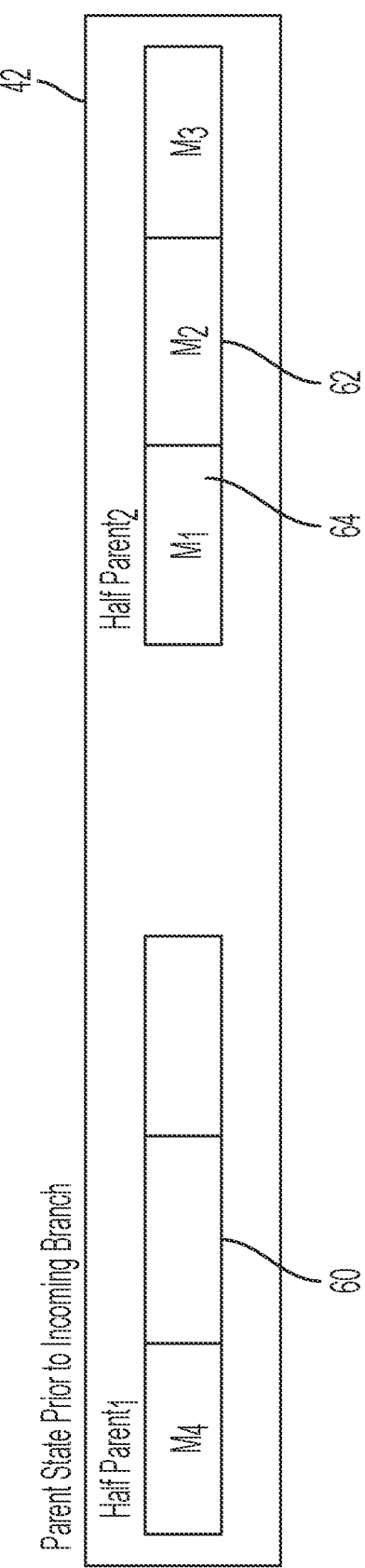
FIGS. 5A and 5B depict an example of BTB half parents having medium format slots, and depict aspects of a method of storing an incoming branch in a half parent.
Figure 5B:
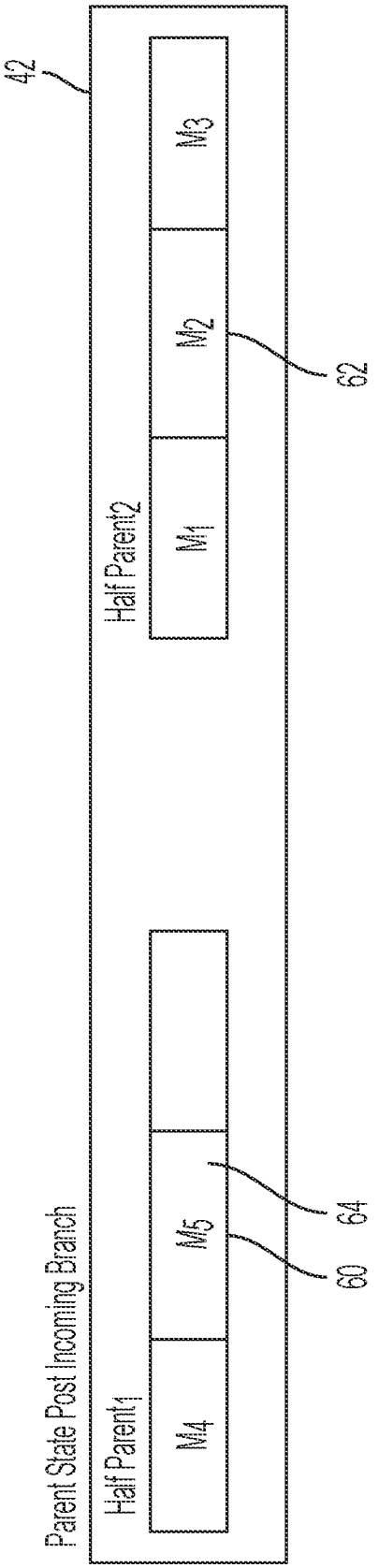

FIGS. 5A and 5B show an example where incoming entries are compatible with the current half parent size. In FIG. 5A, half parent 62 is entirely occupied by three medium entries $M_1$, $M_2$ and $M_3$, and half parent 60 stores a medium entry $M_4$. At FIG. 5B, an incoming entry $M_5$ is received and stored in one of the medium slots of the half parent 60. In another example (not shown), if a half parent has one large entry already stored therein and another large entry is received, the half parent can store that incoming large entry without any wasted space.

If an incoming entry is incompatible with available slots in a half parent, the BTB1 logic or branch predictor 28 can dynamically reconfigure the incoming entry format and/or reconfigure the format of an existing slot as part of a branch prediction method. It is noted that the reformatting and storing can be performed during a single write and during a single pipeline pass.

Figure 6A:
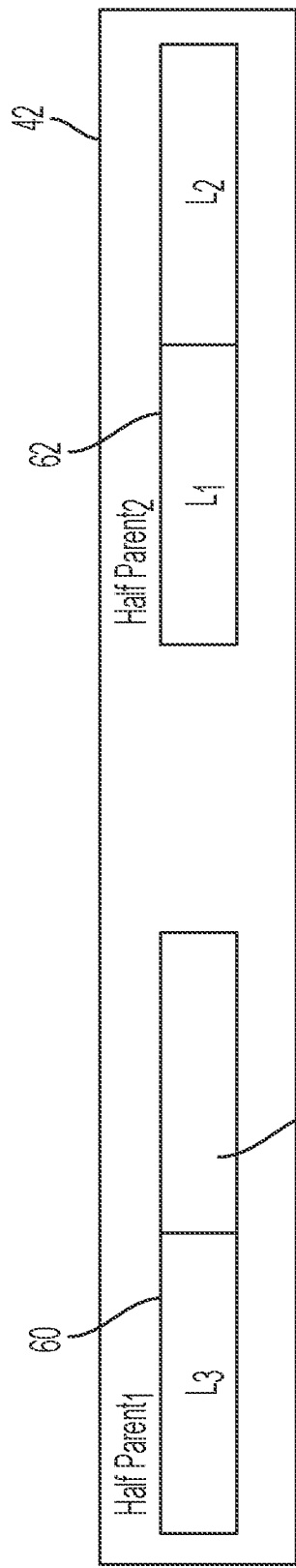
FIGS. 6A and 6B depict an example of BTB half parents having large format slots, and depict aspects of an embodiment of a branch prediction method that includes dynamically reformatting an incoming branch.
Figure 6B:
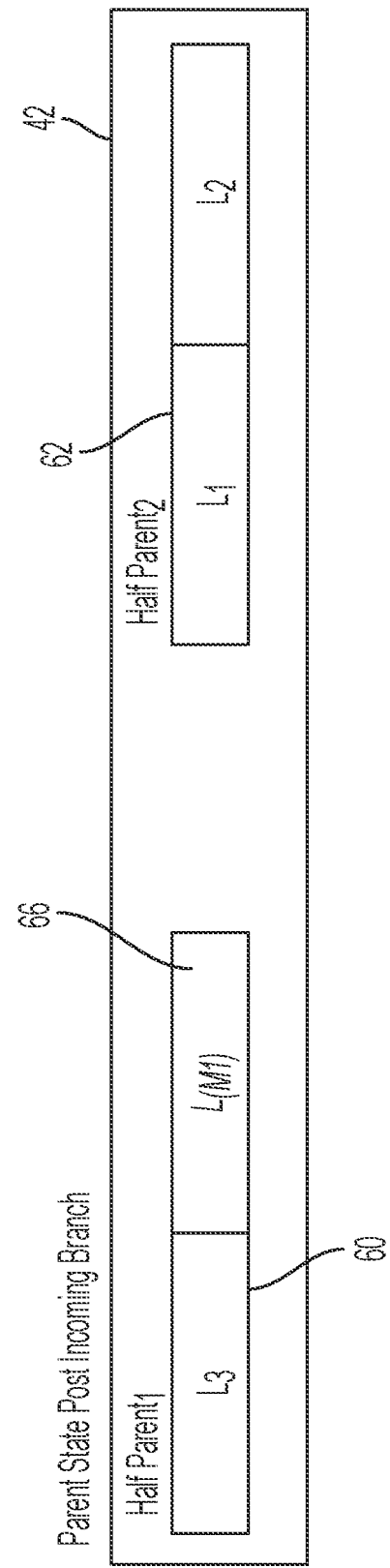

FIGS. 6A and 6B show an instance where an incoming entry is incompatible with existing slot formats and sizes. In this example, half parents 60 and 62 each have two large slots, with half parent 60 including a large entry $L_3$, and an empty slot, and half parent 62 including large entries $L_1$ and $L_2$ (FIG. 6A). If an incoming branch is a medium branch ($M_1$), then the incoming branch can be reformatted into a large format branch ($L_{M1}$) and stored in the empty slot (FIG. 6B). A medium branch can be reformatted or reencoded into a large branch, for example, by adding extra bits from the tag array into the expanded target field, or adding additional bits indicating that this branch has been reformatted.

Figure 7A:
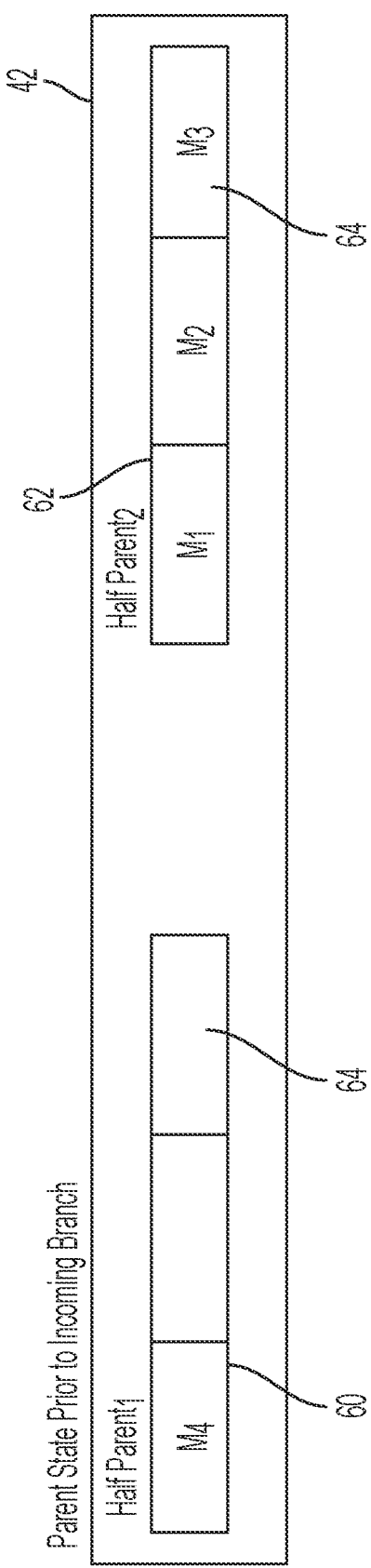
FIGS. 7A and 7B depict an example of BTB half parents having medium format slots, and depict aspects of an embodiment of a branch prediction method that includes dynamically reformatting both an existing branch and a half parent.
Figure 7B:
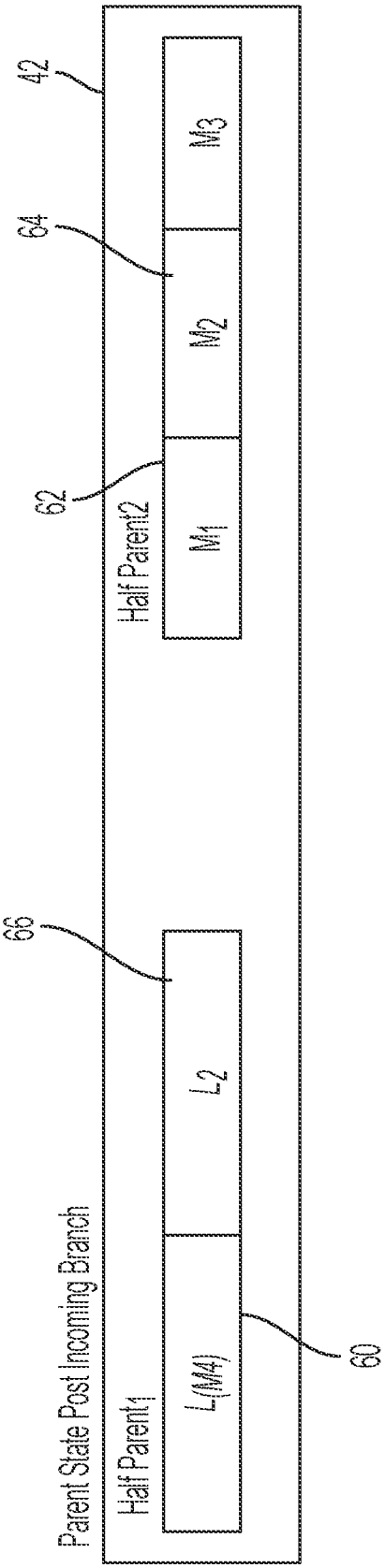

An incoming medium entry can be reformatted as a large entry, and/or an existing medium slot can be reformatted as a large slot. FIGS. 7A and 7B show an instance where an incoming branch is incompatible, and also shows an example in which both a half parent slot and an existing branch are reformatted. In this example, the half parent 60 includes three medium slots and stores a medium branch $M_4$. The half parent 62 includes three medium slots in which branches $M_1$, $M_2$ and $M_3$ are stored. A large branch $L_1$ is received, and an existing slot of the half parent 60 is reformatted so that the half parent 60 has two large slots. In addition, the medium branch $M_4$ is reformatted into a large branch $L_{M4}$.

The following describes an embodiment of a method for writing to a level one BTB as part of a branch prediction method. In response to receiving an incoming branch, the branch predictor 28 determines whether there are any branches in a half parent prior to the current pass.

If there are branches already in the half parent, the predictor determines whether there is a matching entry format for the smallest format that the incoming branch can use. If the half parent with the matching entry format has space for an install, the incoming branch is installed in the half parent with the current entry format.

If there is no half parent with a matching entry format, and/or there is no space in a half parent with a matching entry format, the predictor may install into an uninitialized half parent (if available) and set the entry format. For example, the incoming branch is installed in an available slot, and the half parent entry format (e.g., L or M) is set based on the incoming branch.

If the only available half parent is one with a non-compatible entry format (e.g., the incoming branch is large and the available entry format is medium, or vice versa), the branch predictor determines whether the available half parent is in a medium format. If the available entry format is large, and the incoming entry is medium, the incoming branch is reformatted to large and stored therein. If the half parent entry format is medium and the incoming branch is large, the entry format is changed to large and any existing entry is reformatted to large.

As discussed above, BTB2 buffers are intended to maximize storage space, whereas BTB1 buffers are selected to maximize speed and throughput. An embodiment of the branch predictor and associated method is provided to increase density by configuring BTB2s to have a plurality of different container sizes. Half parents provide a means to group branches together; however, an entry (e.g., 2 half parents*(3 medium or 2 large) branches per directory entry) may not be fully utilized (low density). This embodiment provides for increased branch density with limited latency trade-offs.

Figure 8:
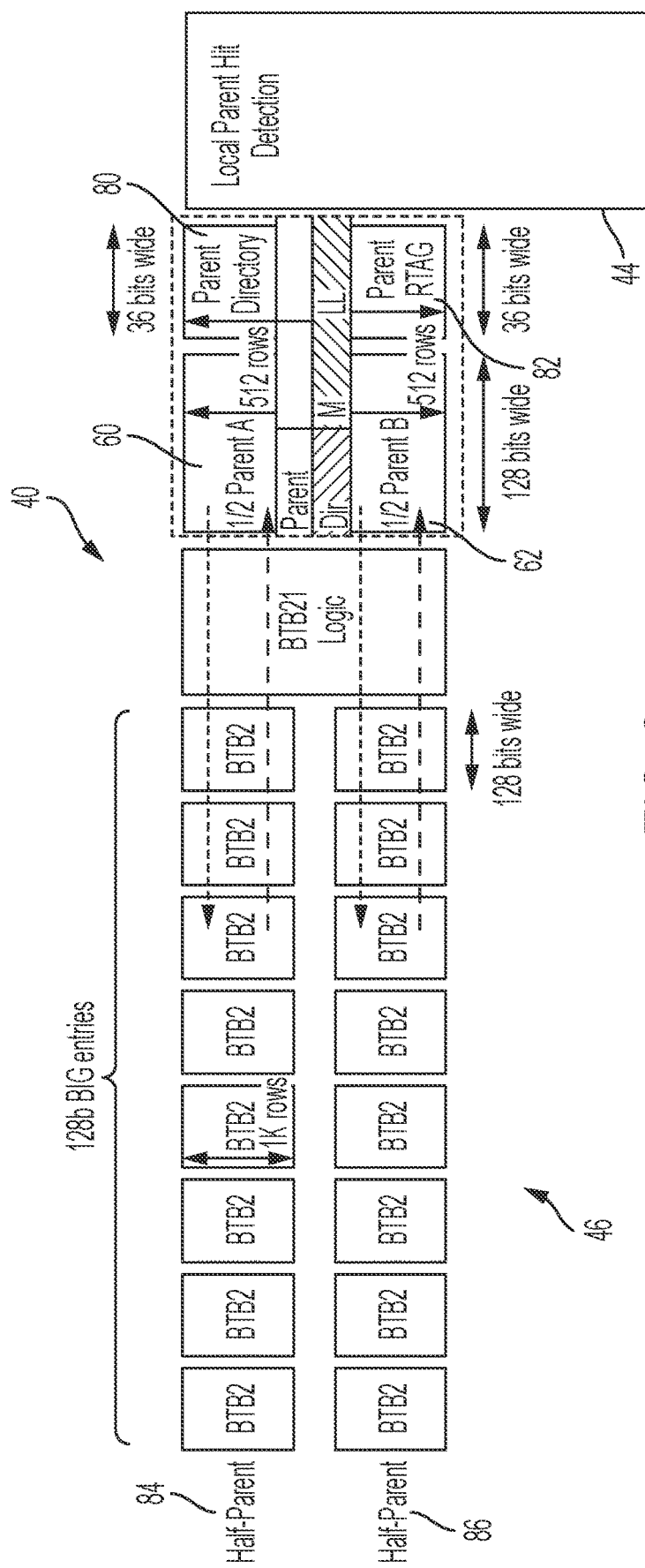
FIG. 8 depicts an embodiment of a portion of a branch predictor including a level one BTB (BTB1) and a level two BTB (BTB2)

A shown in FIG. 8, a BTB2 may be divided into parents and half parents. Unlike the BTB1 structure, in which the half parents share the same tag, BTB2 half parents each have their own tag, and can be written to independently.

FIG. 8 depicts a portion of the BTB system 40 including one parent BTB1 that includes half parents 60 and 62. The BTB1 also includes or is connected to a parent directory 80 and a parent tag array 82. The BTB2 structure includes a parent BTB2 46 that is divided into half parents 84 and 86, and each half parent includes a plurality of containers 88 configured to store entries of a selected size. Each half parent 84 and 86 has its own directory and can be written to independently. The BTB2 half parent 84 reads from and writes to the BTB1 half parent 60, and the BTB2 half parent 86 reads from and writes to the BTB1 half parent 62. In some instances (e.g., if only one of the BTB1 half parents 60 and 62 is being written to the parent BTB2 46), the BTB1 half parent 60 can write to either the BTB2 half parent 84 or the BTB2 half parent 86, or the BTB1 half parent 62 can write to either the BTB2 half parent 84 or the BTB2 half parent 86. An entry to the BTB2 structure from a half parent may include a plurality of individual branches indexed according to the BTB1 directory. An example of an entry is shown in FIG. 8, which includes a directory index (Dir), a medium branch M and two large branches L (denoted as LL).

In some instances, an entry provided to the BTB2 structure is not completely full, e.g., some of the slots (medium and/or large) may be empty. In such instances, the density of entries in the BTB2 structure is reduced.

In an embodiment, each half parent may be further associated with sub-arrays having various sizes or formats. Half parents of a given parent may be independent of one another, e.g., each half parent may have its own tag. Thus, half parents can be given a different granularity to accommodate various entry sizes.

Figures 9, 10:
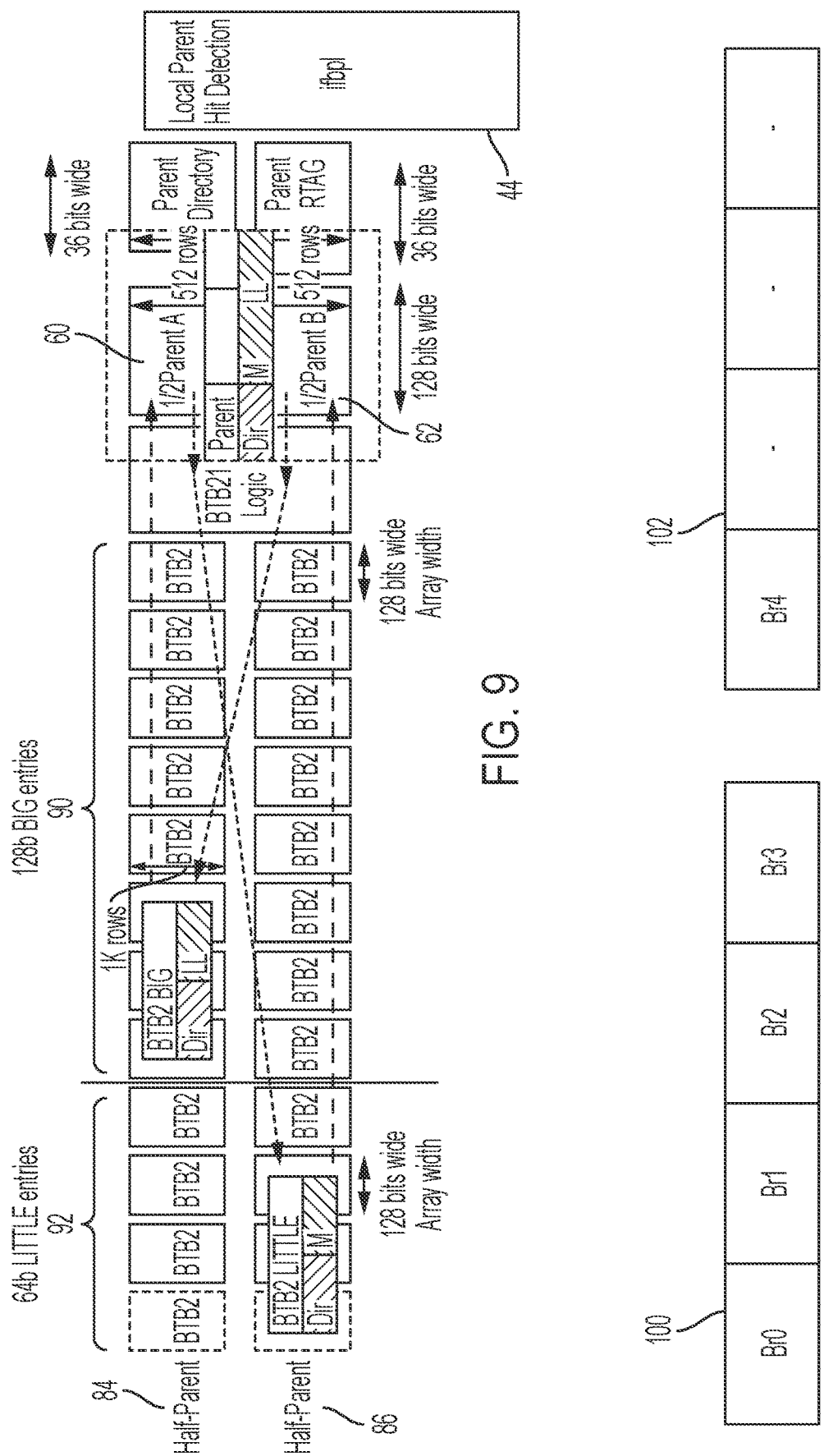
FIG. 9 depicts an embodiment of a portion of a branch predictor including a BTB1 and a BTB2, the BTB2 including a plurality of container sizes for storing branch entries.
FIG. 10 depicts an example of a line of metadata of a BTB1, the line split into BTB1 parent arrays.

FIG. 9 depicts an embodiment of the BTB system 40, in which the BTB2 half parents are each divided into two sets of sub-arrays, also referred to as containers: a first set of containers 90 having a first size (e.g., 128 bit width), and a second set of containers 92 having a second, smaller size (e.g., 64 bit width). The first set of containers 90 are referred to as "big" containers, and the second set of containers 92 are referred to as "little" containers. Generally, the sizes of the containers are selected based on considerations including branch and storage characteristics. Any number of sizes can be selected.

Each BTB1 half parent 60, 62 can move an entry to a big container 90 or a little container 92 in a given cycle. An entry may include an index and one or more branches. For example, a full entry includes two large branches or three medium branches. BTB1 half parents can be merged into a single entry (e.g., including both medium and large branches).

In this embodiment, up to two entries can be written in a cycle (e.g., one for each BTB1 half parent, and each BTB1 half parent can write to a BTB2 in parallel). A half parent 60, 62 can write to a big container 90 or a little container 92 in either BTB2 half parent (can "crisscross" on a write). For example, if both BTB1 half parents write to the BTB2 structure, then half parent 60 could write to half parent 84, and half parent 62 could write to half parent 86. In the example of FIG. 9, the medium branch M is written from the BTB1 half parent 60 to a little container 92 in the BTB2 half parent 86 (as an entry with the directory index and the medium branch), and the large branches LL are written from the BTB1 half parent 62 to a big container 90 in the BTB2 half parent 84 (as an entry with the directory index and the large branches).

If both entries have a size (e.g., medium) that can fit into a little container entries are little, then they can be combined into a single entry that can be written to a big container 90. If a first entry has a size that can fit into a big container 90 (and is too large to fit in a little container 92), and a second entry can fit in a little container 92, then the first entry may be written to one BTB2 half parent 84, 86, and the second entry may be written to the other BTB2 half parent 84,86.

Selection of which container to be written to may be governed by a least recently used (LRU) selection policy. An embodiment of such a policy has three layers. At the parent level, the BTB2 parent is implied by the associated BTB1 parent. If a single half parent entry is written (i.e., an entry from either half parent 60 or half parent 62), selection of which BTB2 half parent is based on the LRU half parent.

Selection of a big container within a BTB2 half parent may be the LRU big container, and selection of a little container within a BTB2 half parent may be based on the LRU little container (noting that if a big container is written to and a little entry is also written, the little entry should be written to the other BTB2 half parent). Associativity between a little container and its half parent could be maintained when a big container is not leveraged.

A little container may be made of an array that is larger than the size of a little entry. For example, a little container can be a 128 bit container in which little entries (64-bit) can be installed. The little container can have 2:1 associativity with the left 64-bits of the little container and the right 64-bits. When installing a little entry in a given half-parent, another LRU can then determine if the write occurs into the left 64 bits or the right 64 bits of the 128 bit field.

Embodiments related to variable BTB2 container size present a number of advantages. Half parents provide a means to group branches together; however, an entry (e.g. 2 half parents*(3 medium or 2 large) branches per directory entry) may not be fully utilized (low density). Upon moving content to the BTB2, increased or maximum branch density can be achieved.

In an embodiment, the branch predictor 28 is configured to structure each BTB2 with sub-parent granularity (e.g., half parent granularity or less) and dynamic associativity, so that lines in the BTB2 can be tracked to identify low utilization lines.

As discussed above, an entry to a parent BTB1 includes a shared line tag and one or more branch entries (or branches). Each branch includes a branch address, a target address and a prediction, and may include additional metadata. If an entry is larger than a given parent (has more branches than slots in the parent), the entry can be split into multiple parents.

FIG. 10 depicts an example of a BTB1 line (e.g., a 128 byte line) that is split into multiple parent arrays or parent (e.g., each having a 64 byte line). In this example, an entry with five branches Br0, Br1, Br2, Br3 and Br4 are stored in a 128 B line, and each parent 100 and 102 (e.g., parents 42a and b in FIG. 2) has space for four branches. Thus, the line is split into two parents 100 and 102. The parent 100 stores Br0, Br1, Br2 and Br3, and the parent 102 stores Br4. As shown, the parent 102 is underutilized (three empty branch slots). If the parents 100 and 102 are evicted to a BTB2 structure, then there will be underutilized space in the BTB2 structure.

Figure 11:
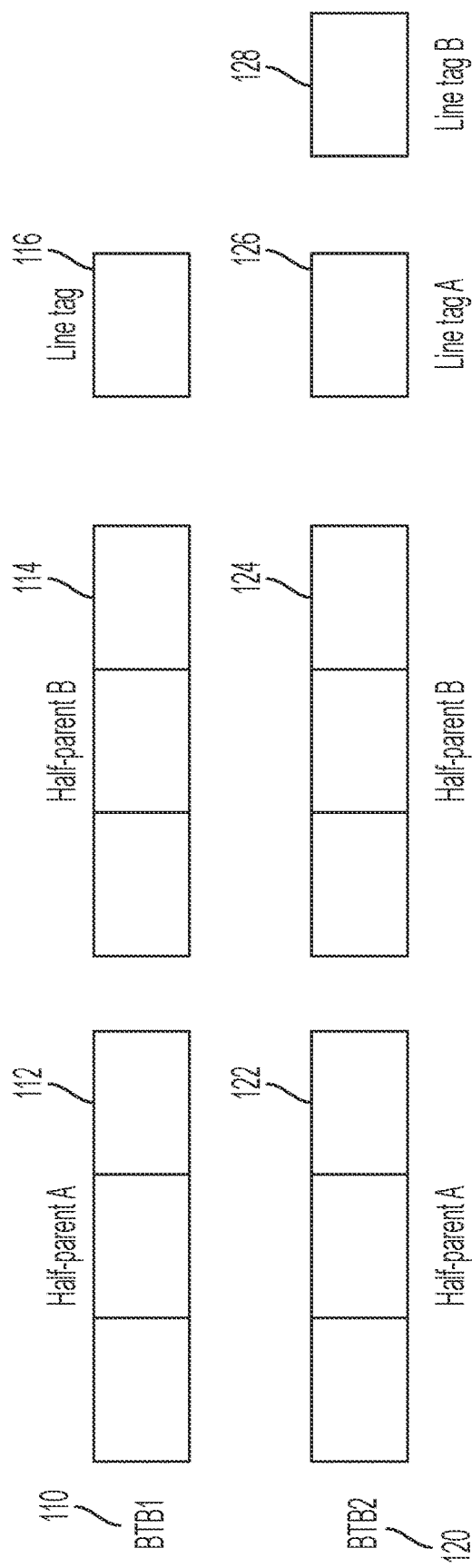
FIG. 11 depicts an embodiment of a BTB2 having dynamic associativity with a BTB1 parent.

FIG. 11 depicts an embodiment of a BTB2 parent 120 that has dynamic associativity with a corresponding BTB1 line 110. The BTB1 line 110 includes a half parent 112 and a half parent 114, each of which includes three slots. The half parents 112 and 114 are each associated with a line tag 116. The BTB2 parent 120 includes a half parent 122 and a half parent 124. The BTB2 parent 120 has two line tags, line tag 126 and 128, which allow for the associativity between the BTB1 and BTB2 half parents to be dynamically changed (e.g., from 1:1 to 2:1). Although two line tags are shown, a BTB line can be configured to have any number of lines tags to achieve desired associativity. It is noted that the BTB1 and BTB2 parents and/or lines may be split into any size for accommodation of various entry sizes.

Figure 12:
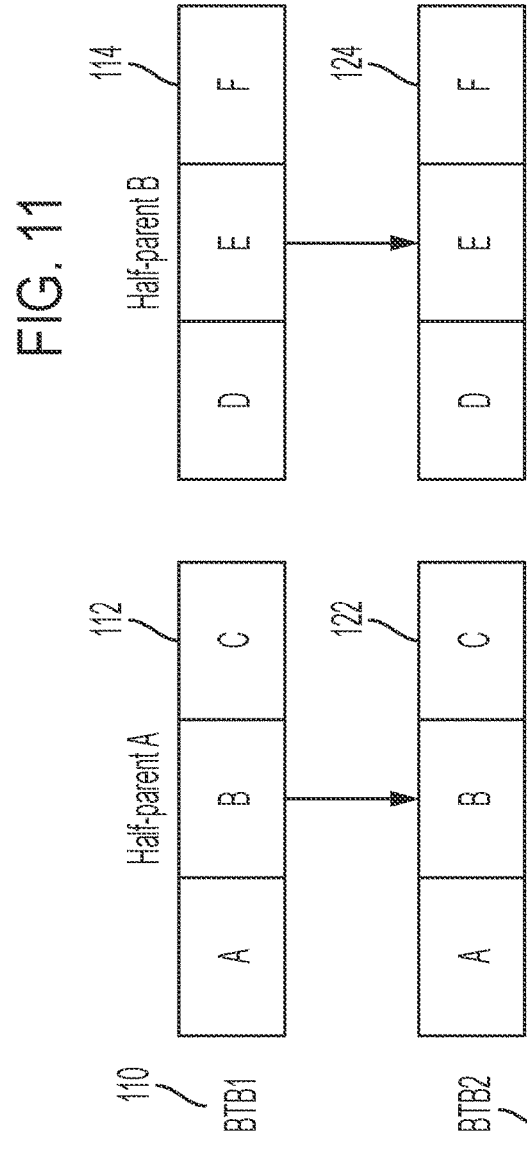
FIG. 12 depicts an example of BTB a BTB1 parent having half parents, and a BTB2 parent, and depicts aspects of an embodiment of a branch prediction method.

FIG. 12 depicts an example of an aspect of a branch prediction method in which a full BTB1 parent is evicted from a BTB1 to a BTB2 structure. In this example, the half parent 112 has branches A, B and C stored therein, and the half parent 114 has branches D, E and F stored therein. The line tag 116 for the parent 110 is denoted as X. When transferring BTB1 content to the BTB2 parent 120, the BTB2 half parents 122 and 124 are used. Because all of the content in the BTB2 parent was taken from the BTB1 parent 110, both line tags 126 and 128 are populated with the line tag X (providing 1:1 associativity).

FIG. 13 shows an example in which branches from only one BTB1 half parent are evicted or transferred to the BTB2 parent 120. As shown, the half parent 112 is populated with three branches, and the half parent 114 has none. If the BTB1 victim (branches A, B and C) already exists, it is stored into the same BTB2 location it already exists in, and made the most recently used (MRU). Otherwise, the victim is written to whichever BTB2 half-parent was LRU (in this example, half parent 124), and made MRU. The line tag 128 (X) is the same as the line tag 116. The other half parent 122 can be populated with another entry from the same BTB1 parent at a different time frame. For example, branches G, H, I were written at another time from the same BTB1 parent (having line tag Y), and the line tag entry is populated accordingly.

The dynamically associative BTB2 parent may be used to merge branches from various locations. In addition, the branch predictor 28 may be configured to dynamically change the format of an entry as discussed above.

FIG. 14 shows an example of a merging process and a reformatting process using dynamic associativity, performed during a cycle, as part of a branch prediction method. In this example, branches from different half parents of a BTB1 parent are merged into a single BTB2 half parent, and reformatted if needed. The BTB1 half parent 112 includes one occupied slot (containing a branch A), and two unoccupied slots, and the BTB1 half parent 114 includes one occupied slot (containing a branch B), and one unoccupied slot. The slots in the half parent 112 are formatted as medium slots, and the slots in the half parent 114 are formatted as large slots.

When transferring branches A and B to the BTB2 parent 120, the branches are written to slots in the same BTB2 half parent 124, and the line tag 128 is updated to X to be the same as the line tag 116. Half parent 122 can be populated with branches G, H and I from another time frame of the same BTB1 parent and given the line tag Y associated with the BTB1 parent entry.

If the format of the slots written to are different than the format of the branches, the branches are re-formatted accordingly. For example, branch A is re-formatted to the large format to correspond to the format of the half parent 124.

Branch prediction methods may include a line splitting stage (e.g., a stage in which the BTB1 line 110 is split as discussed above) in order to increase speed and formatting efficiency. Dynamically associative BTB2 structures can be used to facilitate line splitting.

Figure 15A:
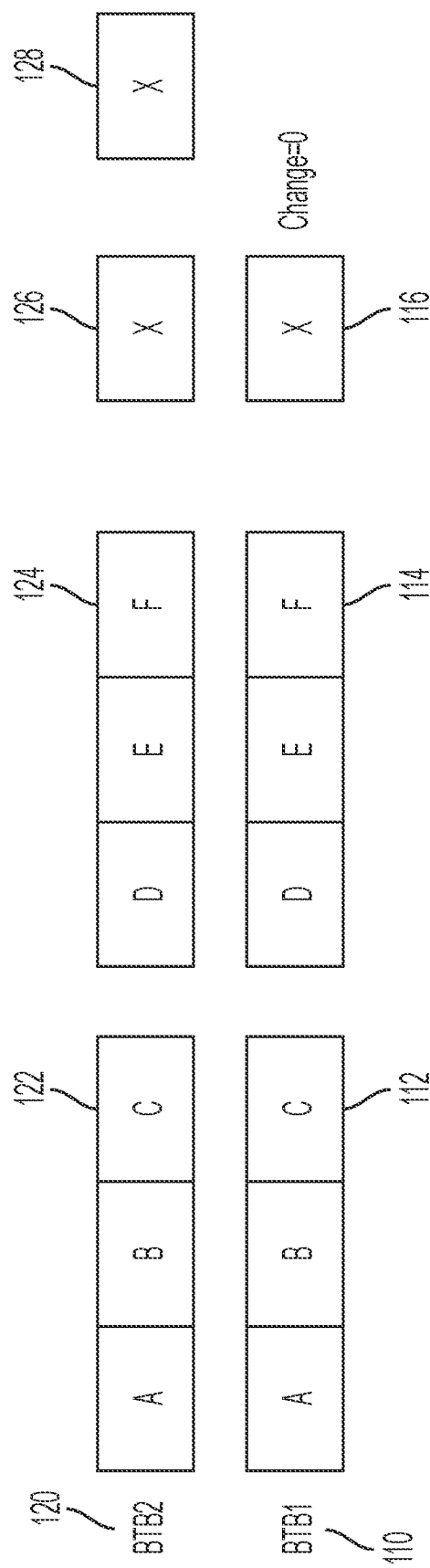
FIGS. 15A and 15B depict an example of BTB1 parent having half parents, and a BTB2 parent, and depict aspects of an embodiment of a branch prediction method that includes line splitting a BTB1 parent and dynamically changing an associativity of the BTB2 parent.
Figure 15B:
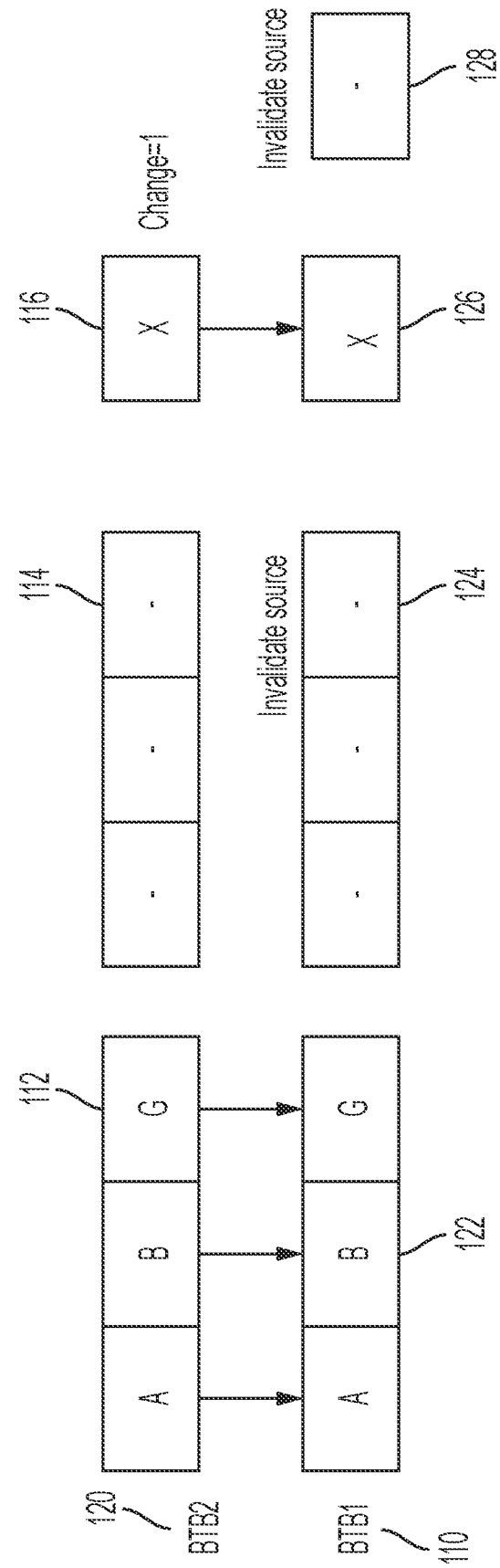

FIG. 15 illustrates the use of the dynamically associative BTB2 in line splitting. At FIG. 15A, the BTB1 parent 110 is fully populated with branches A-F. A branch is received for storing. When line splitting is performed, at FIG. 15B, fewer branches are stored in this parent than exist in an associated BTB2 parent. Upon line splitting, the branches (A, B and G) are stored in half parent 122, and the remaining half parent 124 is invalidated.

Because BTB1 and BTB2 index sizes may be different, a BTB1 victim from a particular BTB1 row can map to one of multiple different rows in the BTB2. The BTB2 LRU information can be read speculatively in anticipation of encountering a BTB1 victim. To perform such an action, the LRU state of multiple BTB2 rows is used.

LRU arrays can be structured to allow for such speculative reading. FIG. 16 depicts an embodiment of a LRU structure 132 that includes LRU states for multiple BTB2 rows. The LRU structure is searchable by LRU Index, and has the same depth as the BTB1, or smaller (such as ½ size or ¼ size) to save area and share entries among aliasing rows. Each LRU row in the structure 132 contain $2^n$ entries, where n is the number of bit differences between the BTB1 and BTB2 index. Each entry width in the structure 132 is based on the sub-parent granularity, e.g., 1 bit if 2 half-parents. In the example of FIG. 16, the LRU index (BTB2 LRU Index) based on the difference between the BTB2 Line Index and the BTB1 Line Index from an array 130.

The LRU structure 132 may be read in parallel with pipeline(s) finding BTB1 victims, e.g., triggered by a BTB2 search. For example, BTB2 index bits (e.g., bits 46:47) are taken from the BTB1 tag of a victim. The LRU Index may be used to determine, via a multiplexer 134, when installing to a parent, which half parent to write to.

Embodiments that include dynamic associativity as described herein present a number of advantages. For example, such embodiments allow for higher utilization of predictor structures, thereby improving performance and reducing chip area. The embodiments enables a higher capacity predictor than systems without this dynamic associativity. Metadata characteristics (storage requirements based on branch density) can be learned while in the level 1 BTB, and based on that learning, metadata can be stored as efficiently as possible in the level 2 BTB upon eviction from level 1.

Figure 17:
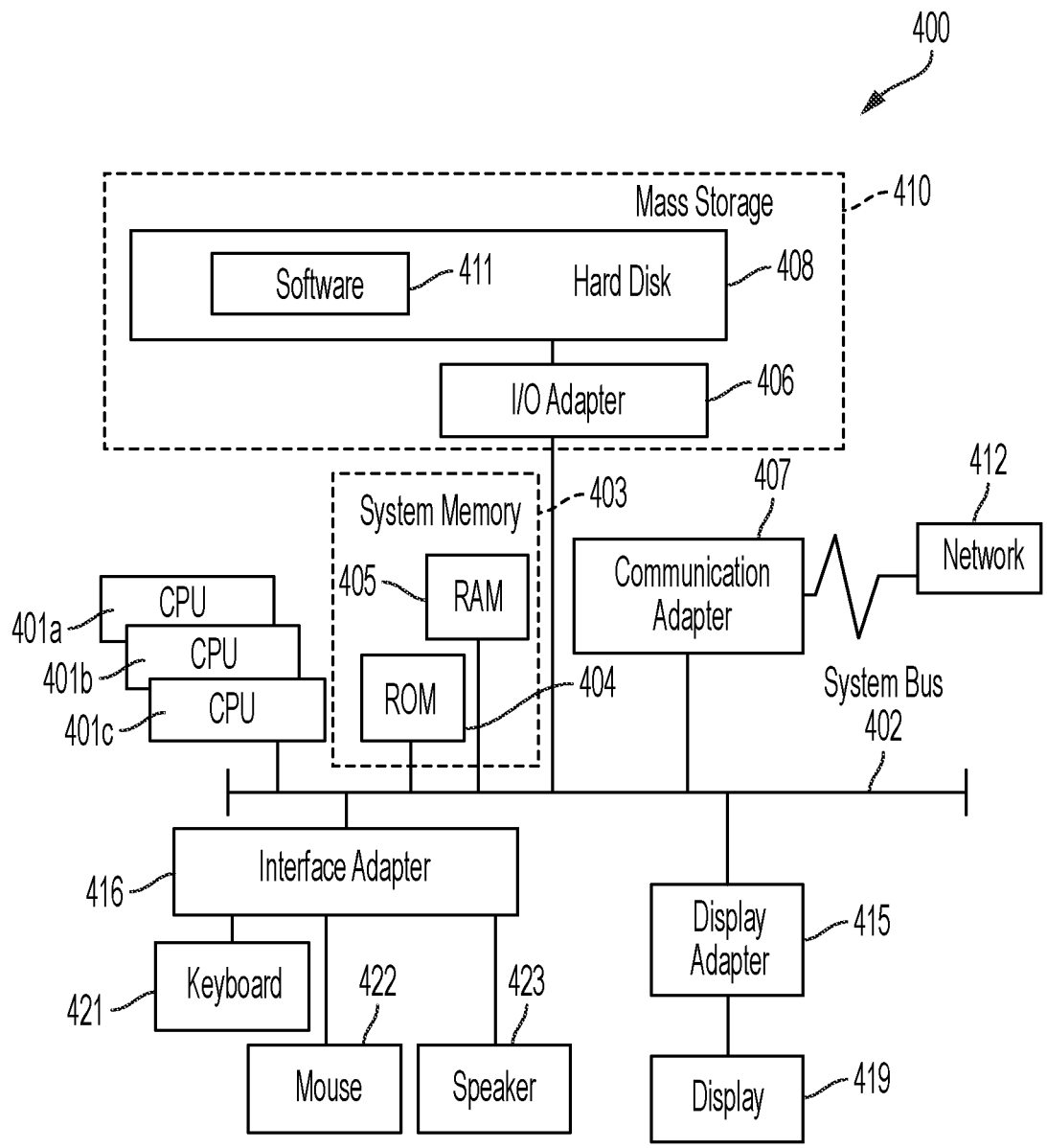
FIG. 17 is a block diagram illustrating an embodiment of a computer system configured to perform aspects of methods described herein.

Referring to FIG. 17, a computer system 400 is generally shown in accordance with an embodiment. The computer system 400 can be an electronic, computer framework comprising and/or employing any number and combination of computing devices and networks utilizing various communication technologies, as described herein. The computer system 400 can be easily scalable, extensible, and modular, with the ability to change to different services or reconfigure some features independently of others. The computer system 400 may be, for example, a server, desktop computer, laptop computer, tablet computer, or smartphone. In some examples, computer system 400 may be a cloud computing node. Computer system 400 may be described in the general context of computer system executable instructions, such as program modules, being executed by a computer system. Generally, program modules may include routines, programs, objects, components, logic, data structures, and so on that perform particular tasks or implement particular abstract data types. Computer system 400 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 16, the computer system 400 has one or more central processing units (CPU(s)) 401a, 401b, 401c, etc. (collectively or generically referred to as processor(s) 401). The processors 401 can be a single-core processor, multi-core processor, computing cluster, or any number of other configurations. The processors 401, also referred to as processing circuits, are coupled via a system bus 402 to a system memory 403 and various other components. The system memory 403 can include a read only memory (ROM) 404 and a random access memory (RAM) 405. The ROM 404 is coupled to the system bus 402 and may include a basic input/output system (BIOS), which controls certain basic functions of the computer system 400. The RAM is read-write memory coupled to the system bus 402 for use by the processors 401. The system memory 403 provides temporary memory space for operations of said instructions during operation. The system memory 403 can include random access memory (RAM), read only memory, flash memory, or any other suitable memory systems.

The computer system 400 comprises an input/output (I/O) adapter 406 and a communications adapter 407 coupled to the system bus 402. The I/O adapter 406 may be a small computer system interface (SCSI) adapter that communicates with a hard disk 408 and/or any other similar component. The I/O adapter 406 and the hard disk 408 are collectively referred to herein as a mass storage 410.

Software 411 for execution on the computer system 400 may be stored in the mass storage 410. The mass storage 410 is an example of a tangible storage medium readable by the processors 401, where the software 411 is stored as instructions for execution by the processors 401 to cause the computer system 400 to operate, such as is described herein with respect to the various Figures. Examples of computer program product and the execution of such instruction is discussed herein in more detail. The communications adapter 407 interconnects the system bus 402 with a network 412, which may be an outside network, enabling the computer system 400 to communicate with other such systems. In one embodiment, a portion of the system memory 403 and the mass storage 410 collectively store an operating system, which may be any appropriate operating system, such as the z/OS or AIX operating system from IBM Corporation, to coordinate the functions of the various components shown in FIG. 16.

Additional input/output devices are shown as connected to the system bus 402 via a display adapter 415 and an interface adapter 416. In one embodiment, the adapters 406, 407, 415, and 416 may be connected to one or more I/O buses that are connected to the system bus 402 via an intermediate bus bridge (not shown). A display 419 (e.g., a screen or a display monitor) is connected to the system bus 402 by a display adapter 415. A keyboard 421, a mouse 422, a speaker 423, etc. can be interconnected to the system bus 402 via the interface adapter 416, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 16, the computer system 400 includes processing capability in the form of the processors 401, and, storage capability including the system memory 403 and the mass storage 410, input means such as the keyboard 421 and the mouse 422, and output capability including the speaker 423 and the display 419.

In some embodiments, the communications adapter 407 can transmit data using any suitable interface or protocol, such as the internet small computer system interface, among others. The network 412 may be a cellular network, a radio network, a wide area network (WAN), a local area network (LAN), or the Internet, among others. An external computing device may connect to the computer system 400 through the network 412. In some examples, an external computing device may be an external webserver or a cloud computing node.

It is to be understood that the block diagram of FIG. 16 is not intended to indicate that the computer system 400 is to include all of the components shown in FIG. 4. Rather, the computer system 400 can include any appropriate fewer or additional components not illustrated in FIG. 16 (e.g., additional memory components, embedded controllers, modules, additional network interfaces, etc.). Further, the embodiments described herein with respect to computer system 400 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process detail.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A hierarchical metadata prediction system comprising:
a first line-based predictor having a first line for storage of a plurality of metadata entries;
a second line-based predictor configured to store one or more of the plurality of metadata entries from the first line-based predictor, the second line-based predictor having a second line, the second line including a plurality of containers, the plurality of containers including at least a first set of containers having a first size and a second set of containers having a second size, wherein at least one of the first line and the second line is configured as a parent array, the parent array including a set of sub-parent arrays, each of the set of sub-parent arrays divided into a plurality of slots, each slot of the plurality of slots being a subset of a sub-parent array, each slot having a length configured to store a number of bits; and
a processor configured to transfer a metadata entry of the one or more metadata entries between the first line-based predictor and the second-line based predictor, the processor configured to dynamically reconfigure the length of a slot of the plurality of slots based on a metadata entry format of the metadata entry so that the metadata entry is compatible with the slot.

2. The system of claim 1, wherein the first line-based predictor is a first level branch target buffer (BTB1), the second line-based predictor is a second level branch target buffer (BTB2), and the plurality of metadata entries include branch entries.

3. The system of claim 1, wherein at least part of the first line is configured as one or more first parent arrays, and at least part of the second line is configured as one or more second parent arrays, each of the one or more second parent arrays including at least one container having the first size and at least one container having the second size.

4. The system of claim 3, wherein the one or more second parent arrays are each divided into a plurality of sub-parent arrays, at least part of the first set of containers and at least part of the second set of containers included in each sub-parent array.

5. The system of claim 4, wherein the first line-based predictor is configured to transfer the metadata entry from the first line-based predictor to one or more of the plurality of sub-parent arrays, and to store the transferred metadata entry into one or more containers based on a size of the metadata entry.

6. The system of claim 1, wherein at least part of the first line is configured as a first parent array, and at least part of the second line is configured as a second parent array, the second parent array including at least one container having the first size and at least one container having the second size.

7. The system of claim 6, wherein the first parent array is associated with a first line tag configured to identify a location of the first parent array, and the second parent array is associated with a respective line tag.

8. The system of claim 7, wherein the first parent array includes a plurality of first sub-parent arrays, and the first line tag is a line tag common to each of the plurality of first sub-parent arrays.

9. The system of claim 1, wherein each of the plurality of slots has a format that is independently configurable based on the metadata entry format.

10. The system of claim 1, wherein the processor is further configured to receive an instruction from a processing pipeline, generate the metadata entry based on the instruction, and perform at least one of:
storing the metadata entry in a particular slot of one of the set of sub-parent arrays; and
reconfiguring the metadata entry format so that the metadata entry is compatible with the particular slot.

11. A computer-implemented method comprising:
receiving an instruction from a processing pipeline at a hierarchical metadata prediction system, the metadata prediction system including a first line-based predictor having a first line for storage of a plurality of metadata entries, and a second line-based predictor configured to store one or more of the plurality of metadata entries from the first line-based predictor, the second line-based predictor having a second line, the second line including a plurality of containers, the plurality of containers including at least a first set of containers having a first size and a second set of containers having a second size, wherein at least one of the first line and the second line is configured as a parent array, the parent array including a set of sub-parent arrays, each of the set of sub-parent arrays divided into a plurality of slots, each slot of the plurality of slots being a subset of a sub-parent array, each slot having a length configured to store a number of bits; and
transferring a metadata entry of the one or more metadata entries from the first line-based predictor to the second line-based predictor, wherein the transferring includes storing the metadata entry into one or more containers based on a size of the metadata entry, wherein the length of a slot of the plurality of slots is dynamically reconfigurable based on a metadata entry format of the metadata entry so that the metadata entry is compatible with the slot.

12. The method of claim 11, wherein at least part of the first line is configured as one or more first parent arrays, and at least part of the second line is configured as one or more second parent arrays, each of the one or more second parent arrays including at least one container having the first size and at least one container having the second size.

13. The method of claim 12, wherein the one or more second parent arrays are each divided into a plurality of sub-parent arrays, at least part of the first set of containers and at least part of the second set of containers included in each sub-parent array.

14. The method of claim 11, wherein at least part of the first line is configured as a first parent array, and at least part of the second line is configured as a second parent array, the second parent array including a plurality of second sub-parent arrays, wherein the first parent array is associated with a first line tag configured to identify a location of the first parent array, and each second sub-parent array is associated with a respective line tag.

15. The method of claim 14, wherein the first parent array includes a plurality of first sub-parent arrays, and the first line tag is a line tag common to each of the plurality of first sub-parent arrays.

16. The method of claim 11, wherein each of the plurality of slots has a format that is independently configurable based on the metadata entry format.

17. A computer program product, the computer program product comprising:
a non-transitory tangible storage medium readable by a processing circuit and storing instructions for execution by the processing circuit for performing a method comprising:
receiving an instruction from a processing pipeline at a hierarchical metadata prediction system, the metadata prediction system including a first line-based predictor having a first line for storage of a plurality of metadata entries, and a second line-based predictor configured to store one or more of the plurality of metadata entries from the first line-based predictor, the second line-based predictor having a second line, the second line including a plurality of containers, the plurality of containers including at least a first set of containers having a first size and a second set of containers having a second size, wherein at least one of the first line and the second line is configured as a parent array, the parent array including a set of sub-parent arrays, each of the set of sub-parent arrays divided into a plurality of slots, each slot of the plurality of slots being a subset of a sub-parent array, each slot having a length configured to store a number of bits; and
transferring a metadata entry of the one or more metadata entries from the first line-based predictor to the second line-based predictor, wherein the transferring includes storing the metadata entry into one or more containers based on a size of the metadata entry, wherein the length of a slot of the plurality of slots is dynamically reconfigurable based on a metadata entry format of the metadata entry so that the metadata entry is compatible with the slot.

18. The computer program product of claim 17, wherein at least part of the first line is configured as one or more first parent arrays, and at least part of the second line configured as one or more second parent arrays, each of the one or more second parent arrays divided into a plurality of sub-parent arrays, at least part of the first set of containers and at least part of the second set of containers included in each sub-parent array.

19. The computer program product of claim 17, wherein at least part of the first line is configured as a first parent array, and at least part of the second line is configured as a second parent array, the second parent array including a plurality of second sub-parent arrays, wherein the first parent array is associated with a first line tag configured to identify a location of the first parent array, and each second sub-parent array is associated with a respective line tag.

20. The computer program product of claim 17, wherein each of the plurality of slots has a format that is independently configurable based on the metadata entry format.

* * * * *